US012309174B2

(12) United States Patent
File et al.

(10) Patent No.: US 12,309,174 B2
(45) Date of Patent: *May 20, 2025

(54) CHANGE MONITORING AND DETECTION FOR A CLOUD COMPUTING ENVIRONMENT

(71) Applicant: Capital One Services, LLC, McLean, VA (US)

(72) Inventors: Daniel W. File, Baltimore, MD (US); Hao Liu, Reston, VA (US); Rajesh Kanna Durairaj, Plano, TX (US); Peter Terrana, Mechanicsville, VA (US)

(73) Assignee: Capital One Services, LLC, McLean, VA (US)

( * ) Notice: Subject to any disclaimer, the term of this patent is extended or adjusted under 35 U.S.C. 154(b) by 840 days.

This patent is subject to a terminal disclaimer.

(21) Appl. No.: 17/530,614

(22) Filed: Nov. 19, 2021

(65) Prior Publication Data

US 2022/0078188 A1 Mar. 10, 2022

Related U.S. Application Data

(63) Continuation of application No. 16/750,245, filed on Jan. 23, 2020, now Pat. No. 11,201,865, which is a
(Continued)

(51) Int. Cl.
*H04L 29/06* (2006.01)
*G06F 18/2323* (2023.01)
(Continued)

(52) U.S. Cl.
CPC ...... *H04L 63/1416* (2013.01); *G06F 18/2323* (2023.01); *G06N 20/00* (2019.01); *H04L 63/0876* (2013.01); *H04L 63/104* (2013.01)

(58) Field of Classification Search
None
See application file for complete search history.

(56) References Cited

U.S. PATENT DOCUMENTS 7,603,452 B1 10/2009 Guo
7,647,622 B1 1/2010 Sobel et al.
(Continued)

FOREIGN PATENT DOCUMENTS

EP 3080741 B1 3/2018

OTHER PUBLICATIONS

Gavron ("Python for Social Science", found at http://gawron.sdsu.edu/python_for_ss/course_core/book_draft/Social_Networks/Social_Networks.html, Jan. 28, 2018). (Year: 2018).*
(Continued)

*Primary Examiner* — Piotr Poltorak
(74) *Attorney, Agent, or Firm* — Banner & Witcoff, Ltd.

(57) ABSTRACT

Aspects described herein allow for systems and methods to monitor production changes to resources in a cloud computing environment and determine whether those changes were performed in accordance with a change management policy. A change order monitoring application receives data from cloud computing audit logs to detect infrastructure changes and combines that data with application information to determine which application was affected. The change order monitoring application then uses a machine learning algorithm to cluster multiple change events together when it is likely that the change events were part of the same change. If cluster of change activity does not appear to be authorized, the change order monitoring application sends an alert to a change management team and an application team to get more information about the activity.

18 Claims, 5 Drawing Sheets

Related U.S. Application Data continuation of application No. 16/514,406, filed on Jul. 17, 2019, now Pat. No. 10,581,851.

(51) Int. Cl.
*G06N 20/00* (2019.01)
*H04L 9/40* (2022.01)

(56) References Cited

U.S. PATENT DOCUMENTS

| | | | |
|---|---|---|---|
| 8,713,633 | B2 | 4/2014 | Thomas |
| 9,282,162 | B2 | 3/2016 | Boyle et al. |
| 9,692,789 | B2 | 6/2017 | Kirti et al. |
| 10,023,749 | B2 | 7/2018 | Collins et al. |
| 10,027,689 | B1 | 7/2018 | Rathor et al. |
| 10,104,029 | B1* | 10/2018 | Chambers ............ H04L 51/212 |
| 10,129,109 | B2 | 11/2018 | Jayanti Venkata et al. |
| 10,176,435 | B1 | 1/2019 | Sarkar et al. |
| 10,216,880 | B1 | 2/2019 | Liu et al. |
| 10,257,181 | B1 | 4/2019 | Sherif et al. |
| 10,311,967 | B2 | 6/2019 | Bagaev et al. |
| 10,320,841 | B1 | 6/2019 | Allen |
| 10,341,403 | B2 | 7/2019 | White et al. |
| 10,341,430 | B1 | 7/2019 | Badawy et al. |
| 10,380,381 | B2 | 8/2019 | Scaiano et al. |
| 10,409,995 | B1 | 9/2019 | Wasiq et al. |
| 10,581,851 | B1 | 3/2020 | File et al. |
| 2004/0153992 | A1 | 8/2004 | Molina-Moreno et al. |
| 2004/0199576 | A1 | 10/2004 | Tan |
| 2004/0221190 | A1 | 11/2004 | Roletto et al. |
| 2006/0155738 | A1 | 7/2006 | Baldwin et al. |
| 2008/0114710 | A1 | 5/2008 | Pucher |
| 2011/0167469 | A1 | 7/2011 | Letca et al. |
| 2014/0222538 | A1 | 8/2014 | Merrifield, Jr. et al. |
| 2014/0282871 | A1 | 9/2014 | Rowland et al. |
| 2014/0344399 | A1 | 11/2014 | Lipstone et al. |
| 2015/0172321 | A1 | 6/2015 | Kirti et al. |
| 2015/0379429 | A1 | 12/2015 | Lee et al. |
| 2016/0028758 | A1 | 1/2016 | Ellis et al. |
| 2016/0164901 | A1 | 6/2016 | Mainieri et al. |
| 2016/0275269 | A1 | 9/2016 | Buyse et al. |
| 2016/0335906 | A1 | 11/2016 | Foster et al. |
| 2016/0371489 | A1 | 12/2016 | Puri et al. |
| 2016/0381183 | A1 | 12/2016 | Jusko et al. |
| 2017/0011079 | A1 | 1/2017 | Verma et al. |
| 2017/0056764 | A1 | 3/2017 | Shukla |
| 2017/0195359 | A1 | 7/2017 | Grigoryan et al. |
| 2017/0195436 | A1 | 7/2017 | Grigoryan et al. |
| 2017/0251003 | A1 | 8/2017 | Rostami-Hesarsorkh et al. |
| 2017/0295199 | A1* | 10/2017 | Kirti ................... H04L 63/1425 |
| 2018/0077175 | A1 | 3/2018 | DiValentin et al. |
| 2018/0097828 | A1 | 4/2018 | Coskun |
| 2018/0225416 | A1 | 8/2018 | Wong et al. |
| 2018/0307861 | A1 | 10/2018 | Johnson |
| 2018/0351779 | A1 | 12/2018 | Tee et al. |
| 2018/0359135 | A1 | 12/2018 | Tee |
| 2018/0375886 | A1 | 12/2018 | Kirti et al. |
| 2019/0012254 | A1 | 1/2019 | Gupta et al. |
| 2019/0065596 | A1 | 2/2019 | Meron et al. |
| 2019/0068627 | A1 | 2/2019 | Thampy |
| 2019/0196938 | A1 | 6/2019 | Mathen et al. |
| 2019/0347181 | A1 | 11/2019 | Cranfill et al. |
| 2019/0372951 | A1* | 12/2019 | Satija ................... H04M 3/382 |
| 2020/0195679 | A1 | 6/2020 | Du |

OTHER PUBLICATIONS

Medium: "Exploring New Machine Learning Models for Account Security", published in Uber Privacy & Security on Aug. 15, 2017 found at found at https://medium.com/uber-security-privacy/uber-machine-learning-account-security-3aaadef11e45, author unknown.*

Adeline Zhang, "Machine Learning Algorithms Power Security Threat Reasoning and Analysis", May 21, 2019, found at https://nsfocusglobal.com/machine-learning-algorithms-power-security-threat-reasoning-and-analysis/.*

Greene et al., "Tracking the Evolution of Communites in Dynamic Social Networks," Unveristy College Dubline, Technical Report UCD-CSI-2011-06, May 2011.

Hui et al., "Research Intrusion Detection Techniques from the Perspective of Machine Learning", 2010 Second International Conference on Multimedia and Information Technology (vol. 1, pp. 166-168, 4/10, (Year: 2010).

El-Alfy et al., "Learning Mechanism for Anomaly-Based Intrusion Detection: Updated Review", ISBN (Electronic): 978-1-5090-6367-3, 11/17, (Year: 2017).

Coretechnologies, "How to use the Event Viewer to troubleshoot problems with a Windows Service", The core Technologies Blog, 10/14 found at www .coretechnologies.com/blog/windows-services/event-viewer-troubleshoot-windows-services/ (Year: 2014).

* cited by examiner

CHANGE MONITORING AND DETECTION FOR A CLOUD COMPUTING ENVIRONMENT

CROSS REFERENCE TO RELATED APPLICATIONS

This application is a continuation of U.S. application Ser. No. 16/750,245 filed on May 12, 2020, which is a continuation of U.S. application Ser. No. 16/514,406 filed on Jul. 17, 2019 and issued as U.S. Pat. No. 10,581,851 on Mar. 3, 2020, the entirety of which is incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to change monitoring. More specifically, aspects of the disclosure may provide for monitoring change activity in a cloud computing environment using a machine learning algorithm.

BACKGROUND

Incidents cost money, customers, and happiness. One way to reduce incidents is to build a robust enterprise change management process that can promote responsible change management behavior among application teams. A change management program can satisfy regulatory requirements and prevent high severity incidents. The migration to the computing cloud environment has created a challenge to effectively monitor change deployment behavior. Cloud computing environment audit logs enable event level monitoring, but these events are too granular to easily map to application changes. It is possible to monitor and produce change clusters from event data using business rules rather than a machine learning algorithm. However, a rules-based approach would have certain limitations: rules would need to be regularly maintained and updated by a person, and the rules may require significant changes if applied to slightly different data.

Aspects described herein may address these and other problems, and generally improve the quality, efficiency, and speed of monitoring change activity in a cloud computing environment using a machine learning algorithm by providing a near real-time detective control to identify any potential unauthorized changes within the cloud computing environment, using the machine learning algorithm to group change events into change clusters, and sending an automated message or notification to the change implementer and the application team that directs them to enter information about the change activity.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for monitoring change activity in a cloud computing environment using a machine learning algorithm to determine whether those changes were performed in accordance with a change management policy. In implementation, this may be effected by providing a near real-time detective control to identify any potential unauthorized changes within the cloud computing environment to identify up to 10 times or more critical change management violations that previous processes without the example embodiments described herein.

More particularly, some aspects described herein may provide a computer-implemented method for a model to monitor production changes to resources within a cloud computing environment and determine whether those changes were performed in accordance with the change management policy. The method may comprise the following steps: configuring a change order monitoring application, wherein the change order monitoring application receives one or more audit logs from one or more application services in a cloud computing environment, wherein the one or more audit logs comprises a plurality of change events and a plurality of noise events, wherein the plurality of change events require a change order and the plurality of noise events do not require a change order; detecting and filtering, by the change order monitoring application, the plurality of change events from the plurality of noise events in the one or more audit logs; matching, by the change order monitoring application, the plurality of change events to the one or more application services in the cloud computing environment, wherein matching the plurality of change events to the one or more application is based on associating each change event with a corresponding taggable resource; matching, by the change order monitoring application, the plurality of change events to one or more change orders in the cloud computing environment; training a machine learning algorithm based on the plurality of change events; and generating, using the machine learning algorithm and the change order monitoring application, an alert for the one or more unauthorized changes and sending the alert to an implementer of the one or more unauthorized changes. Training the machine learning algorithm may comprise the following steps: clustering the plurality of change events using a weighted event graph comprising the plurality of change events with one or more related connections between the plurality of change events; forming one or more change clusters based on the clustering of the plurality of change events.

According to some embodiments, the one or more audit logs may comprise individual change events and application programming interface (API) calls. Additionally, the one or more related connections between the plurality of change events may comprise two change events that are part of a same user login. Further, the one or more related connections between the plurality of change events may comprise two change events that are from the same application service and occurred within one hour of each other. In addition, matching the plurality of change events to one or more change orders in the cloud computing environment may comprises the following steps: matching a change order configuration item to one of the one or more application services through a change management database mapping; determining an event time window for the one or more change orders and ensuring the matched plurality of change events are within the event time window; and determining the implementer is a member of an implementing group for the change order. Additionally, the event time window may start at one hour before a planned event start time and may end at one hour after a planned event end time. Further, the machine learning algorithm may comprise a python implementation of a Louvain community detection algorithm. In addition, the weighted event graph may comprise weighted edges and the Louvain community detection algorithm may assign each vertex to a cluster to maximize a graph modularity. Additionally, the change order monitoring application may create the weighted event graph with the plurality of change events as edges between the plurality of events that may be part of the same change event, and the Louvain community detection algorithm partitions the same change events into the change clusters, wherein the edges may be determined by one or more edge variables that comprise a resource environment identifier, a resource identifier, and an access key identifier. Further, generating the alert may include automatically notifying the implementer of the one or more unauthorized changes and requesting additional information from the implementer of the one or more unauthorized changes regarding the unauthorized change. In addition, the alert may appear on a dashboard.

Additionally, other aspects described herein may provide a system to monitor production changes to resources within a cloud computing environment and determine whether those changes were performed in accordance with the change management policy. The system may include a database configured to store one or more audit logs from one or more application services in a cloud computing environment, one or more processors; and memory storing instructions. The one or more audit logs may comprise a plurality of change events and a plurality of noise events, wherein the plurality of change events require a change order and the plurality of noise events do not require a change order. The memory storing instructions that, when executed by the one or more processors, cause the one or more processors to: receive, by a change order monitoring application executing on the one or more processors, the one or more audit logs; detect and filter the plurality of change events from the plurality of noise events in the one or more audit logs; match the plurality of change events to the one or more application services in the cloud computing environment, wherein matching the plurality of change events to the one or more application is based on associating each change event with a corresponding taggable resource; match the plurality of change events to one or more change orders in the cloud computing environment; train a Louvain community detection algorithm based on the plurality of change events; determine one or more unauthorized changes from the one or more change clusters, wherein the unauthorized changes are defined as one or more change events that are not matched with one or more change orders and not matched with one or more application services; and generate an alert for the one or more unauthorized changes and automatically send the alert to an implementer of the one or more unauthorized changes. Additionally, the matching of the plurality of changes events to one or more change orders may further include: match a change order configuration item to one of the one or more application services through a change management database mapping; determine an event time window for the one or more change orders and ensure the matched plurality of change events are within the event time window; and determine the implementer is a member of an implementing group for the change order. Further, the instructions may cause the change order monitoring application to train the Louvain community detection algorithm by causing the change order monitoring application to: cluster the plurality of change events using a weighted event graph comprising the plurality of change events with one or more related connections between the plurality of change events; form one or more change clusters based on the clustering of the plurality of change events; determine one or more patterns of performance based on the one or more change clusters, wherein the one or more patterns of performance indicates a potential correlation between the one or more change clusters and the plurality of change events; and update the Louvain community detection algorithm based on the one or more patterns of performance.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for change management in a cloud environment. As companies move from on-premise computing to a cloud environment, it will become necessary to build new tools to monitor and control changes to the production applications. Control over change management is important for building resilient services, both internal and customer facing, but it is also may be a regulatory requirement for applications that impact financial reporting. A change order monitoring application (COMO) may be utilized to monitor all infrastructure changes within the cloud computing environment and production accounts. Additionally, COMO may check those changes against internal change logs to ensure that the changes were performed according to change management policy. The change management policy may include critical violations such as: change without a change, falsification of information, or implementer also an approver. The change management policy may also include process violations such as: outside time window, outside incident window, severity mismatch, change exception invalid, implemented in incorrect status, no incident ticket, or implementer not in performing group.

COMO takes data from cloud computing audit logs to detect infrastructure changes and combines that data with application information to determine which application was affected. COMO then uses machine learning algorithm to combine multiple change events together when it is likely that the change events were part of the same change. If cluster of change activity does not appear to be authorized, COMO sends an alert to a change management team and an application team to get more information about the activity.

Before discussing these concepts in greater detail, however, several examples of a computing device that may be used in implementing and/or otherwise providing various aspects of the disclosure will first be discussed with respect to FIG. 1.

Figure 1:
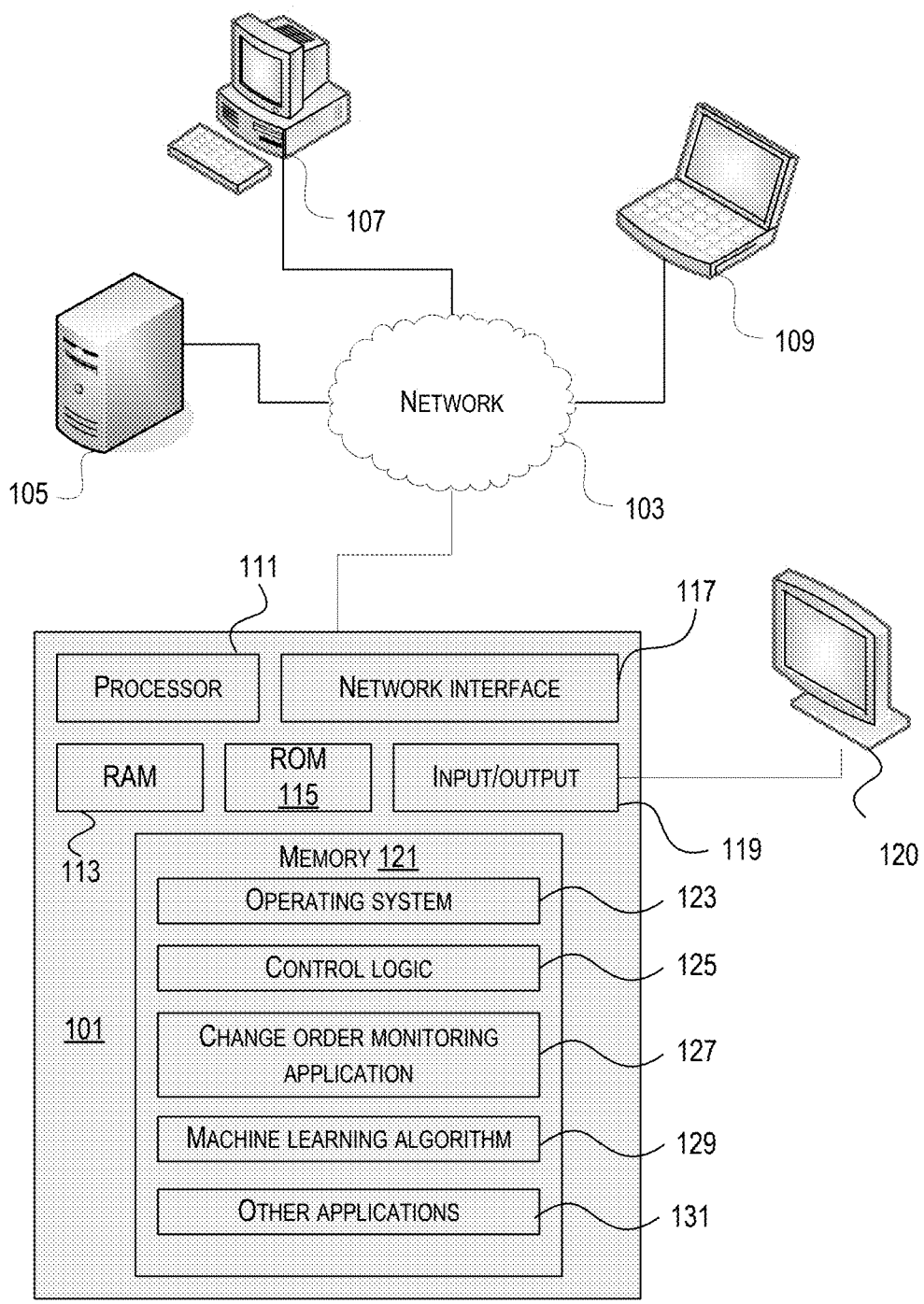
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, change order monitoring application 127, machine learning software 129, and other applications 131. Control logic 125 may be incorporated in and may be a part of machine learning software 129. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, devices 101, 105, 107, 109, and others may operate in concert to provide parallel computing features in support of the operation of control logic 125 and/or application or software 127, 129, 131.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to a method for monitoring change activity in a cloud environment.

Figure 2:
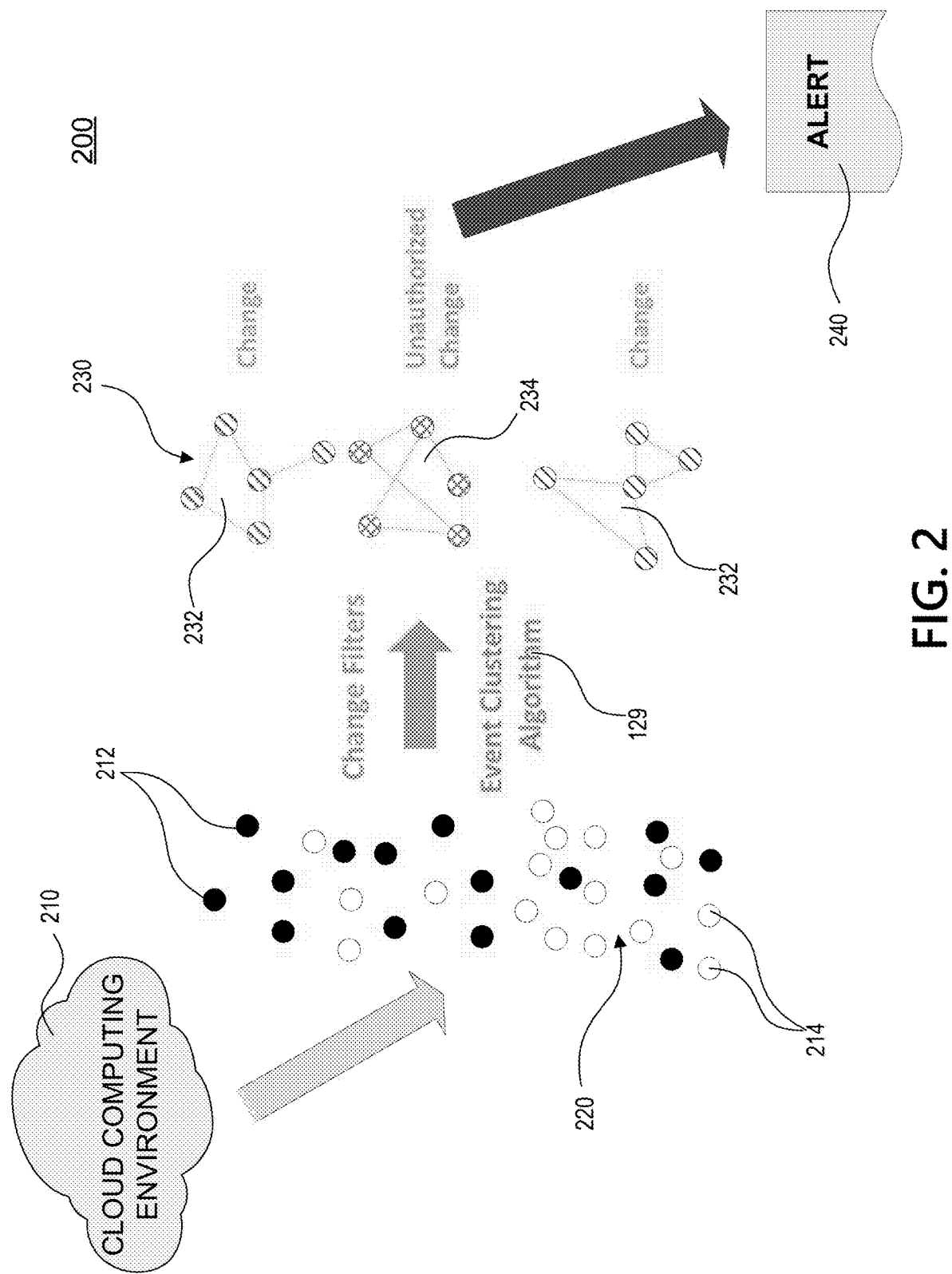
FIG. 2 depicts an example change monitoring overview according to one or more aspects of the disclosure.

FIG. 2 illustrates an example change monitoring overview 200 for a change order monitoring application (COMO) 127. COMO 127 is an application that monitors change activity in a cloud computing environment 210 that may monitor several hundred million events every day across the cloud computing environment 210. COMO 127 monitors events recorded in the cloud computing environment 210. The events recorded in the cloud computing environment 210 may be either change events 212 or noise events/non-change events 214. The change events 212 are generally those events that are associated with a change order. COMO 127 separates and filters the change events 212 and the non-change events 214 as illustrated at 220. This may still leave several hundred thousands of change events compared to several thousand of change orders per day—with about several hundred change events to one change order. COMO 127, using an event clustering algorithm or a machine learning clustering algorithm 129 as illustrated at 230, then clusters the large number of change events into meaningful and similar groups of changes so that the change clusters can be compared to change orders. The change clusters may be compared to change orders based on various variables, such as change identifier or resource tag, change time, and performance group. Any change cluster that has a match to a change order is an authorized change 232. Any change cluster that does not have a match is a potential unauthorized change 234. COMO 127 then may send an alert 240 in the form of a message or notification to an implementer of the change or the application team for validation. Implementers and application teams may respond through a web form in the alert message or notification with whether there is a change order and additional details. Based on the implementer or application team's response, it may be determined whether it is an authorized change 232 or a change violation or unauthorized change 234. COMO 127 may monitor several types of change violations.

Change Order Monitoring (COMO) 127 is an application or model to monitor production changes to resources within various data sources from a cloud computing environment, such as for example, Amazon Web Services (AWS). The example throughout will refer to AWS and AWS tools, but COMO 127 may be application to any cloud computing environment. COMO 127 additionally may determine whether those changes were performed in accordance with a change management policy. To address the risk that unauthorized changes could be made in production, COMO 127 provides a near real-time detective control to identify any potential unauthorized changes within AWS. Prior to the development of COMO 127, a change order management system would investigate and assess violations for unauthorized changes that resulted in outages and incidents. However, there was no systematic way to detect changes to AWS resources or connect those change events to change orders.

The events monitored by COMO 127 may come from various data sources in a cloud computing environment. The mention and discussion of specific tools or services are an example where the cloud provider is AWS. Other cloud computing environments (e.g. Azure or google's icloud) may be utilized and those specific tools or services may be utilized without departing from the example embodiments. For example, the events may come from AWS CloudTrail, a service managed by AWS to provide audit logs for activity. CloudTrail tracks changes to AWS resources such as computing (e.g. EC2), networking (e.g. autoscaling and load balancing), relational and no-SQL databases, identity and access management, and managed services (e.g. AWS Lambda). CloudTrail data to may provide the most complete coverage over changes to AWS resources.

When a change event cannot be matched to a corresponding change order, COMO 127 flags it as a potential unauthorized change. Potential unauthorized changes may appear on dashboards accessible to application teams, leadership, and other stakeholders. In addition, the individual who initiates a potential unauthorized change event may be automatically notified and may need to respond with more information about the change such as the change order or incident number.

COMO 127 may be a deterministic application: events are filtered and matched to change orders according to business rules. However, in some embodiments, at least one aspect of COMO 127 is either non-deterministic or inferential. A typical production change generates many events in CloudTrail. If these events can be matched to a change order, then the changes are naturally grouped together; however, in the case of a potential unauthorized change there may be several dozen events triggering notifications for what is essentially one change. To avoid sending multiple alerts (via email or using messaging applications) for a single potential unauthorized change, COMO 127 may use a machine learning algorithm, such as the Louvain community detection algorithm, to group events into change clusters. One message or notification alert may then be generated from each cluster containing a potential unauthorized change.

Figure 3:
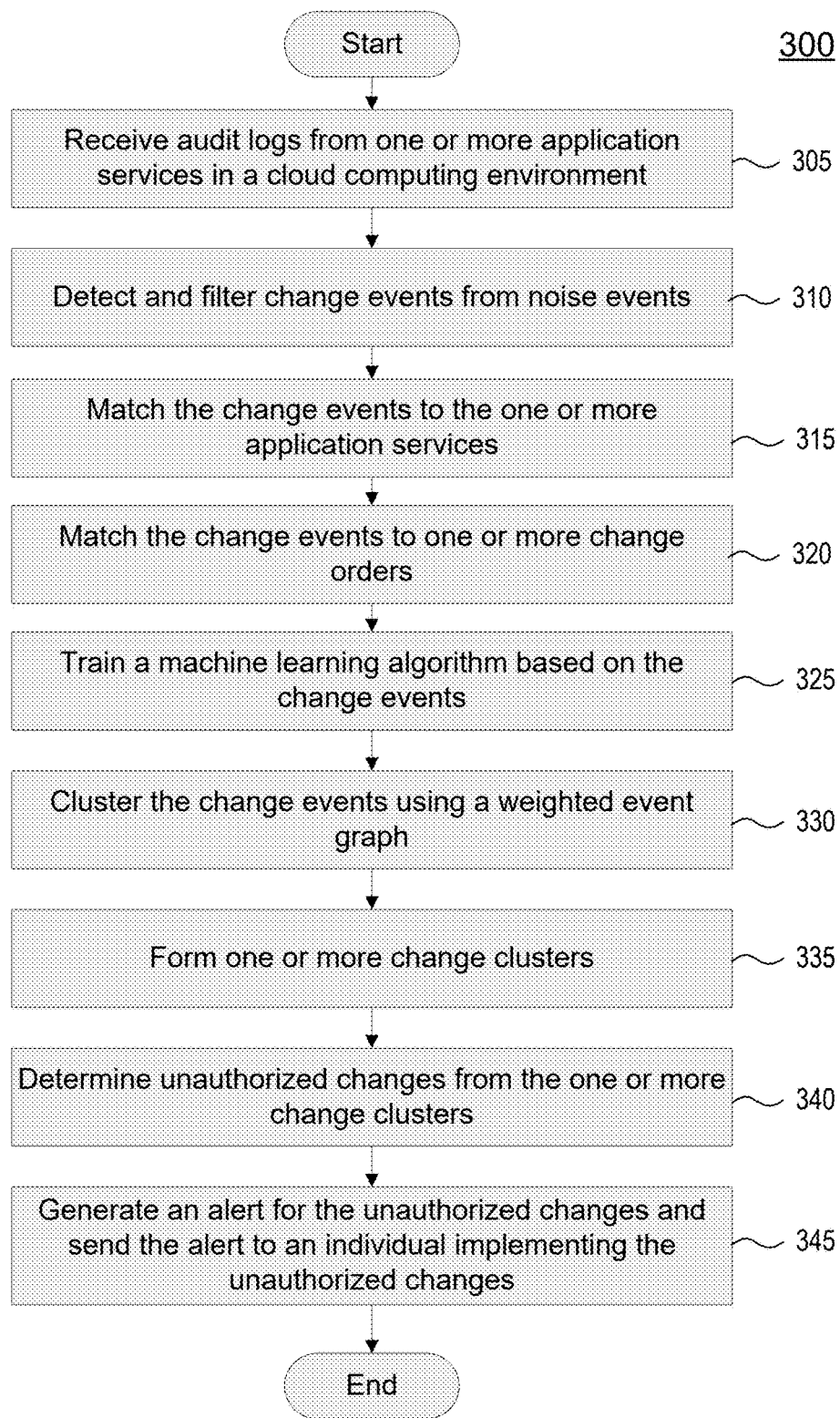
FIG. 3 depicts a flow chart for a method of monitoring change activity in a cloud computing environment according to one or more aspects of the disclosure.

FIG. 3 illustrates an example method 300 for monitoring change activity in a cloud environment in accordance with one or more aspects described herein. Method 300 may be implemented by a suitable computing system, as described further herein. For example, method 300 may be implemented by any suitable computing environment by a computing device and/or combination of computing devices, such as computing devices 101, 105, 107, and 109 of FIG. 1. Method 300 may be implemented in suitable program instructions, such as the change order monitoring application 127 and machine learning algorithm 129.

At step 305, the system and COMO 127 may receive audit logs from one or more application services in a cloud computing environment. COMO 127 may receive events and audit logs from various sources. For example, COMO 127 may use AWS CloudTrail and Config data which are generated by AWS. The mention and discussion of specific tools or services are an example where the cloud provider is AWS. Other cloud computing environments (e.g. Azure or google's icloud) may be utilized and those specific tools or services may be utilized without departing from example embodiments. COMO 127 may also use and change data through one more various service models that define, structure, and automate the flow of work (e.g. ServiceNow application programming interface (API) and Snowflake for business applications (BAPP)) to application services (ASV) mapping and performing group tables. For email notifications COMO 127 may use HR data to link employee identifiers (EIDs) to email addresses, but the HR data set may not be used in COMO's decision making process. All COMO 127 data, both sources and output, may be registered in a cloud server/computer for dataset registration and metadata capture. COMO 127 may rely on the completeness and accuracy of the AWS CloudTrail audit logs. When there is evidence that a change was made that did not follow the change management reporting, COMO 127 may produce an alert and refer the exception to change management. For example, limitations in the quality of data or ability of COMO 127 to parse that data could result in an alert being generated for an authorized change, or no alert for an unauthorized change.

At step 310, the system and COMO 127 may detect and filter change events from noise events. Every day, there may be millions of events logged from the production accounts. However, as an example, only about 1% of these events may represent actual changes to resources that would require a change order. At this step 310, COMO 127 filters out those irrelevant events which mainly involve querying AWS metadata or assuming an AWS role. Generally, COMO 127 may use two principles to determine which events require a change order and are considered change events: 1. Change events effect the configuration of resources; 2. Change events are initiated by a human user through the console, script, or API rather than by an automated event controlled by an AWS services.

At step 315, the system and COMO 127 may match the change events to the one or more application services. In order for COMO 127 to reliably match events to change orders, COMO 127 may identify which AWS resources belong to a particular application service (ASV) or Business Application (BAPP). AWS may allow some resources to be tagged with identifying information, and a cloud governance may require some resources to have specific tags. COMO 127 may use several change management database (CMDB) tables to map a BAPP to its ASV. The data element in the one more various service models that define, structure, and automate the flow of work (e.g. ServiceNow) that corresponds to BAPP may be a "Configuration Item."

In many cases, a change event may directly effect one (or several) resource that has a CMDB Environment tag. For example, the audit log for a terminate instances event includes the instance id. In these cases associating the event with an event tag is simply a matter of querying the instance id in AWS Config, another AWS managed service which stores configuration information for AWS resources, and retrieving the resource tags. The general process may be as follows: 1. Associate each change event with a taggable resource; 2. Obtain the most recent event tag for that resource.

There may be two main challenges to identifying AWS change events with an event tag. The first challenge may be that event data may not contain a taggable resource. However, it may be possible to connect a non-taggable resource with a taggable resource, and then use the event tag of the associated resource. In another embodiment without departing from the example embodiments, events that cannot be matched to a taggable resource in AWS Config may remain within the data and may be written to the enriched events table.

At step 320, the system and COMO 127 may match the change events to one or more change orders. In order for an event to be matched to a change order, three example criteria may be reviewed: 1. The event ASV must match the change order configuration item ASV through the CMDB mapping (the event must affect the ASV/event tag listed in the change order); 2. The eventTime must be within the change window as defined by the planned start/end values in one more various service models that define, structure, and automate the flow of work (e.g. ServiceNow) (the event must have occurred within the change window for the change order); 3. The individual implementing the change must belong to the performing group for the change order (the event must have been performed by a member of the performing group). The precise logic for an event to be within the change order window is event time may be after planned_start less one hour, and event time may be before planned_end plus one hour.

At step 325, the system and COMO 127 may train a machine learning algorithm based on the change events. When a change is implemented, dozens of change events are recorded by CloudTrail. In some embodiments, COMO 127 is configured to produce a single alert for each unauthorized change. Therefore, COMO 127 attempts to cluster together events that were probably part of the same change, and only sends one event per cluster. COMO 127 may use a python implementation of the Louvain community detection algorithm 129 for the event clustering. The Louvain community detection algorithm 129 is a machine learning algorithm that automatically defines event clusters. For example, Louvain community detection algorithm 129 may define the events as vertices (nodes) in a graph (network); put an edge (connection) between two vertices that could be part of the same change activity; assign a weight (number) that reflects the likelihood that the events are part of the same change activity.

At step 330, the system and COMO 127 may cluster the change events using a weighted event graph. For example, the Louvain community detection algorithm 129 takes a weighted graph (i.e. a graph with weighted edges) and attempts to assign each vertex to a cluster so that the graph metric modularity is maximized. Graph modularity measures the density of links within a cluster versus the density of links between clusters.

Specifically, modularity compares the sum of weights within clusters compared to the sum of weights between clusters. Modularity (Q) is the objective function that must be maximized:

$$Q = \sum_{i,j}\left[A_{ij} - \frac{k_i k_j}{2m}\right]\delta(c_i, c_j)$$

i, j are nodes
m is the total number of connections
$A_{ij}$ is the weight of the connection between i and j
$k_i$ is the sum of weights of connections coming from i
$\delta(c_i, c_j)=1$ if i and j are in the same cluster, 0 otherwise
Larger modularity implies more connected and better defined clusters. This is a stochastic algorithm and does not produce the same modularity or clusters if repeated.

At step 335, and related to step 330, the system and COMO 127 may form one or more clusters from the weighted event graph. COMO may create a graph with events as vertices and edges between events that may be part of the same change, and the Louvain machine learning algorithm 129 may partition the events into clusters. Edges are determined by three edge variables: resource environment identifier, resource identifier, and access key identifier. The access key identifier may be a temporary key created when a user logs in or makes an API call. Each pair of events may have as many as three edges connecting them: one edge for each of the three edge variables for which the events share a common value provided that the time between the events is less than the cutoff for that edge variable. Two events (vertices/nodes) may be connected when the events are of the same event tag (within time cutoff), same resource (within time cutoff), or same access key identifier (within time cutoff). The connections may be weighted, such that the closer together in time have larger weights. Specifically, the weight of an edge may be determined by the time between the events and two weight parameters (w1, w2) defined for each edge variable. The formula for the weight between two events that are t seconds apart may be calculated as w=w1/(t+w2).

There are several reasons why it may be difficult to cluster events into changes without using a machine learning algorithm 129. First, some application teams may use multiple logins and methods to implement a change (e.g. console, api, script). Second, a user could implement more than one change using a single login. Third, there may be no uniform cadence for the events within a change. The amount of time between subsequent events in a change may differ between different changes and within a single change. Therefore, the problem of clustering events into changes is more suited to an unsupervised algorithm such as the Louvain community detection algorithm 129 rather than using business rules alone.

At step 340, the system and COMO 127 may determine unauthorized changes from the one or more change clusters. COMO 127 may send a single alert from each change cluster that contains at least one event that is unmatched to a change order. If a cluster does contain an event unmatched to a change order, then one of the unmatched events may be randomly selected to generate an alert to the employee identifier (EID) found in that event. In one embodiment, COMO 127 may be configured to send only one alert per user. In another embodiment, COMO 127 may retain those clustered events without an event tag; however, these events may not by themselves result in alerts. This results in an interesting non-commutative operation: removing vertices from the graph pre/post clustering. Overall, COMO's 127 use of the Louvain community detection algorithm 129 is robust, and pairs of events with event tags tend to be clustered together one way are also clustered together the other.

At step 345, the system and COMO 127 may generate an alert for the unauthorized changes and send the alert to an individual implementing the unauthorized changes. When COMO 127 determines a potential unauthorized change, COMO 127 may send an automated message or notification that directs the implementer and/or the application team to enter additional information regarding the change activity and the potential unauthorized change.

Figure 4A:
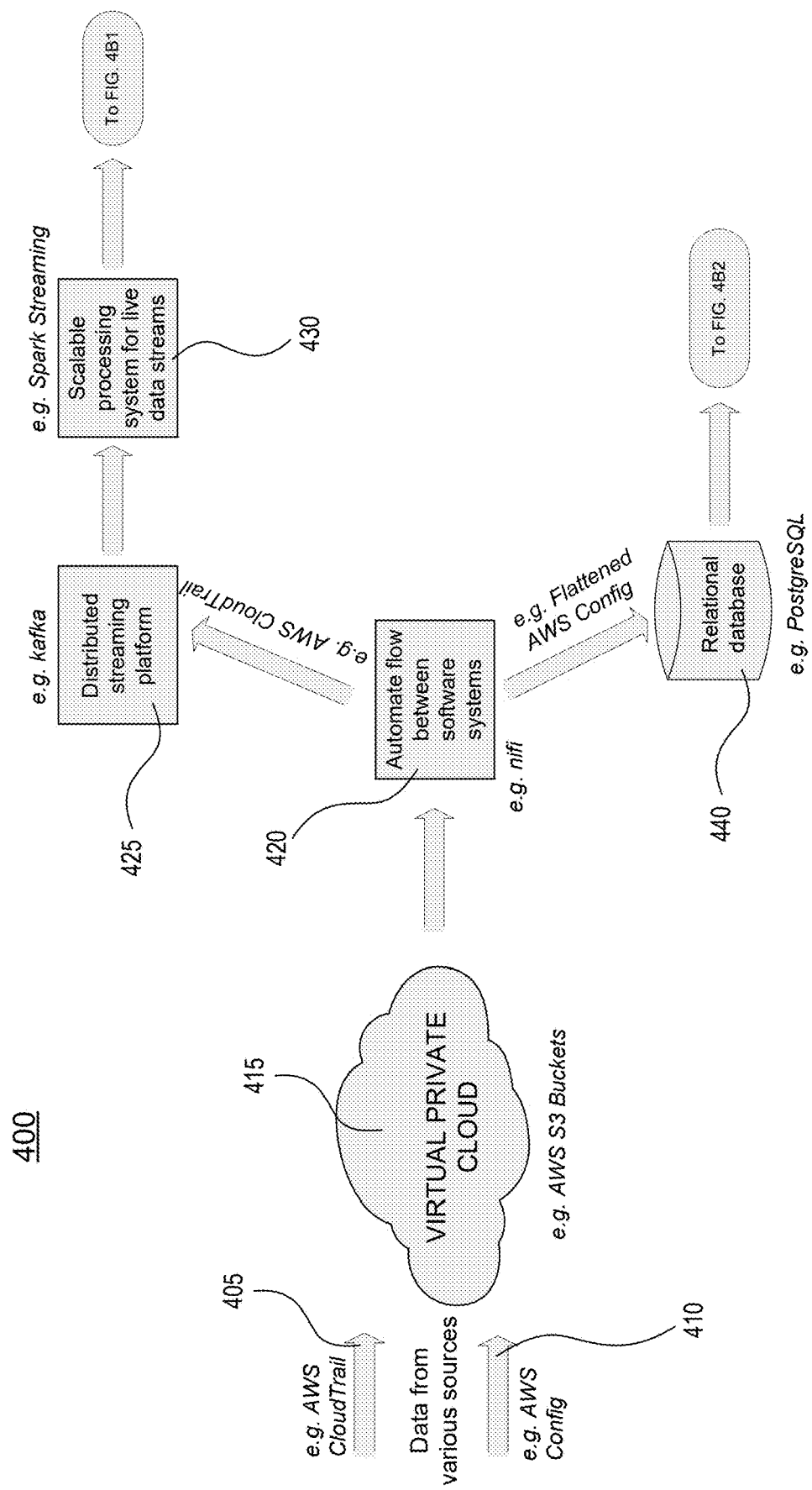
FIGS. 4A and 4B depict an example change monitoring architecture according to one or more aspects of the disclosure.
Figure 4B:
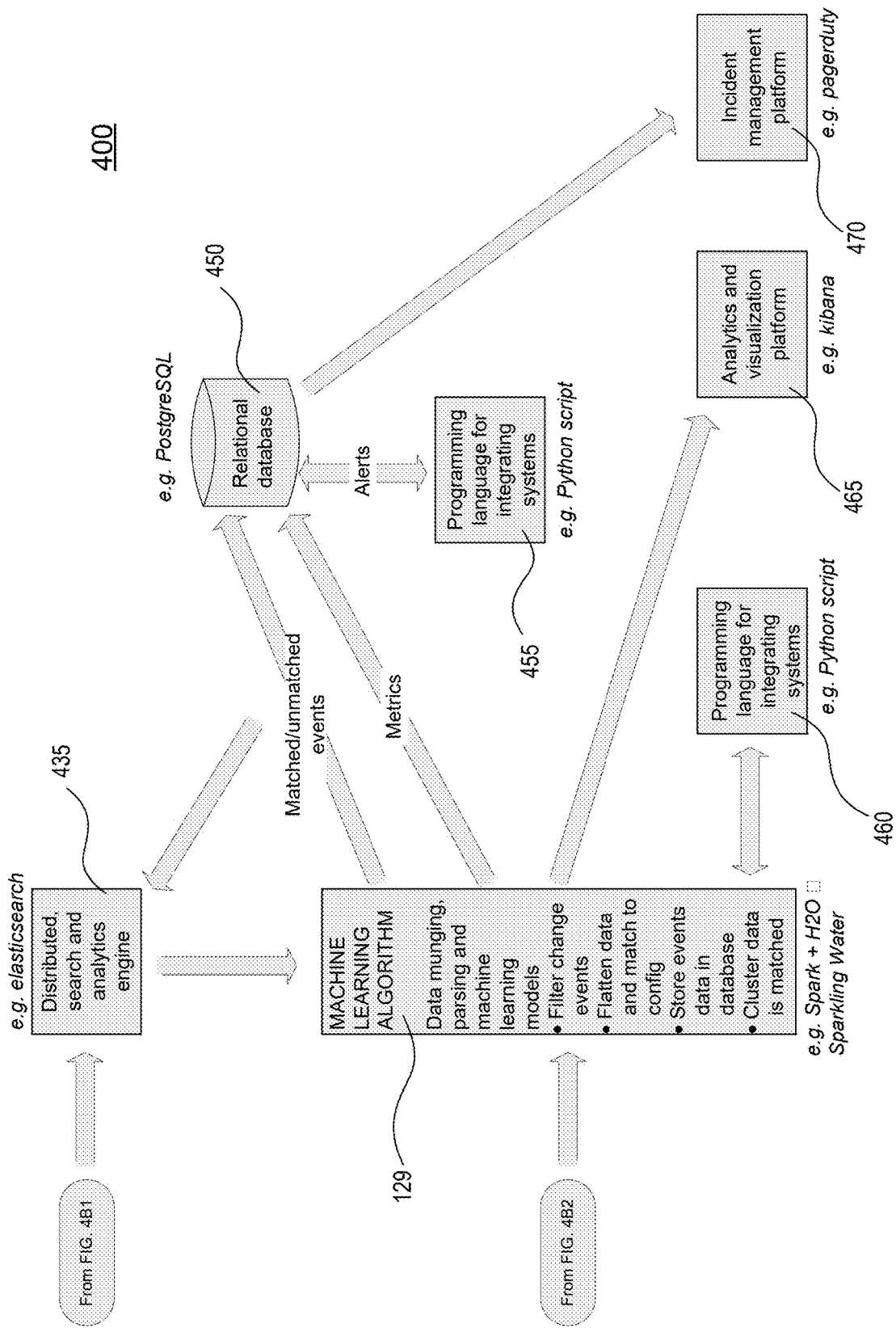

FIGS. 4A and 4B illustrate an example COMO 127 architecture. The representation illustrated in FIGS. 4A and 4B may be modified in accordance with the description as detailed above. FIGS. 4A and 4B illustrate an exemplary data pipeline and data movement for an exemplary COMO 127 architecture. The mention and discussion of specific tools or services are an example where the cloud provider is AWS. Other cloud computing environments (e.g. Azure or google's icloud) may be utilized and those specific tools or services may be utilized without departing from the example embodiments.

First, event data may be pushed by various data sources, such as data from event history and audit logs 405 (e.g. AWS CloudTrail) and data from monitoring and recording resource configurations 410 (e.g. AWS Config) to a virtual private cloud 415. The virtual private cloud 415 may output audit logs to a data storage resource, for example, AWS S3 buckets. From there, a software system 420 may be utilized to automate flow between the various software systems, e.g. Apache nifi. Software system 420 may read the CloudTrail log objects in S3 buckets and write the data to a distributed streaming platform 425, for example kafka. The distributed streaming platform 425, kafka, may be a unified, high-throughput platform for handling real-time data feeds. The virtual private cloud 415 data may then utilize a scalable processing system for live data streams 430, for example Spark Streaming. Spark Streaming 430 may transfer the data from kafka 425 to a distributed, search and analytics engine 435, for example, Elasticsearch. Elasticsearch is a search engine based on the Lucene library and provides a distributed, multitenant-capable full-text search engine with an HTTP web interface. The data from the distributed, search and analytics engine 435 may be then directed to a platform that may be running one or more machine learning algorithms 129.

Additionally, the automated flow software system 420 may read the data from monitoring and recording resource configurations 410 (e.g. AWS Config data), flatten the data from monitoring and recording resource configurations 410 (e.g. AWS Config data) from the virtual private cloud 415 and write the data to a relational database 440, for example PostgreSQL. The relational database 440 may be a relational database management system. The data may be then directed from the relational database 440 to the machine learning algorithm 129.

The machine learning algorithm 129 may provide data munging, parsing, and machine learning models. As was described above, the machine learning algorithm 129 may be a Louvain community detection algorithm. The machine learning algorithm 129 may be configured to enable one or more of the following: filter change events, flatten data and match to configuration data, store events data in a database, and match cluster data. For example, the machine learning algorithm 129 may be configured using Spark+H2O or Sparkling Water. Spark is an open-source distributed general-purpose cluster-computing framework and H2O is an open-source, distributed machine learning platform. Spark may match event data to change orders and a service manager change log and assignment group data within H2O. The machine learning algorithm 129 may send matched and unmatched events to a relational database management system 450, for example PostgreSQL. Additionally, the final matched and unmatched events may be added to the relational database management system 450 and the distributed, search and analytics engine 435. A programming language for integrating systems 455, for example Python script, then queries the relational database management system 450 to select data, such as unauthorized change events, to form alerts and the alerts are saved to the relational database management system 450. The relational database 450 may provide alert information and unauthorized change event information to an incident management platform 470, for example pagerduty. The incident management platform 470 may provide one or more of the following: incident notifications, automatic escalations, and on-call scheduling to help application teams and fix infrastructure problems.

In another step, matched data and change events may be stored in an H2O dataframe and be accessed by a programming language script for integrating systems 460, for example Python script. The script 460 may create event clusters and save the results to the H2O dataframe. Additionally, the machine learning algorithm 129 may generate and identify metrics and output the metrics to the relational database management system 450, for example PostgreSQL. Additionally, the machine learning algorithm 129 may output data for an analytics and visualization platform 465, for example kibana.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computer-implemented method comprising:
receiving, by a change order monitoring application, one or more audit logs from one or more application services in a cloud computing environment, wherein the one or more audit logs comprises a plurality of change events, wherein the plurality of change events require a change order;
matching, by the change order monitoring application, respective change events of the plurality of change events to one or more change orders in the cloud computing environment by:
  matching a change order configuration item to one of the one or more application services through mapping to a change management database;
  determining an event time window for the one or more change orders and ensuring the matched respective change events of the plurality of change events are within the event time window; and
  determining an implementer of the change order configuration item is a member of an implementing group for the change order;
clustering, using a machine learning algorithm, the plurality of change events to form a plurality of change clusters based on the plurality of change events, wherein the machine learning algorithm is trained to group change events that are likely to correspond to a same change event;
determining a potentially unauthorized change cluster from the plurality of change clusters, wherein determining the potentially unauthorized change cluster is based on determining that no change event in the potentially unauthorized change cluster is matched with the one or more change orders in the cloud computing environment;
generating, by the change order monitoring application, an alert for the potentially unauthorized change cluster based on at least a first change event in the potentially unauthorized change cluster; and
sending the alert for the potentially unauthorized change cluster to an implementer of the first change event.

2. The method of claim 1, wherein the one or more audit logs comprise individual change events and application programming interface (API) calls.

3. The method of claim 1, wherein the clustering of the plurality of change events is based on determining two change events that are part of a same user login, are from a same application service, and occurred within one hour of each other.

4. The method of claim 1, wherein the event time window starts at one hour before a planned event start time and ends at one hour after a planned event end time.

5. The method of claim 1, wherein the machine learning algorithm comprises a python implementation of a Louvain community detection algorithm.

6. The method of claim 5, wherein the machine learning algorithm is trained to cluster the plurality of change events using a weighted event graph comprising the plurality of change events with one or more related connections between the plurality of change events.

7. The method of claim 6, wherein the weighted event graph comprises weighted edges and the Louvain community detection algorithm assigns each vertex to a cluster to maximize a graph modularity.

8. The method of claim 6, wherein the change order monitoring application creates the weighted event graph with the plurality of change events as edges between the plurality of change events that are part of the same change event, and the Louvain community detection algorithm partitions the same change events into the change clusters, wherein the edges are determined by one or more edge variables that comprise a resource environment identifier, a resource identifier, and an access key identifier.

9. The method of claim 1, wherein generating the alert includes automatically notifying the implementer of the potentially unauthorized change cluster and requesting additional information from the implementer of the potentially unauthorized change cluster based on at least the first change event in the potentially unauthorized change cluster.

10. The method of claim 1, further including the step of:
matching, by the change order monitoring application, respective change events of the plurality of change events to the one or more application services in the cloud computing environment, wherein matching the plurality of change events to the one or more application services is based on associating each change event with a corresponding taggable resource.

11. A system comprising:
a database configured to store one or more audit logs from one or more application services in a cloud computing environment, wherein the one or more audit logs comprises a plurality of change events, wherein the plurality of change events require a change order;
one or more processors; and
memory storing instructions that, when executed by the one or more processors, cause the one or more processors to:
  receive, by a change order monitoring application executing on the one or more processors, the one or more audit logs;
  match, by the change order monitoring application, respective change events of the plurality of change events to one or more change orders in the cloud computing environment by:
    matching a change order configuration item to one of the one or more application services through mapping to a change management database;
    determining an event time window for the one or more change orders and ensuring the matched respective change events of the plurality of change events are within the event time window; and
    determining an implementer of the change order configuration item is a member of an implementing group for the change order;
  cluster, using a machine learning algorithm, the plurality of change events to form a plurality of change clusters based on the plurality of change events, wherein the machine learning algorithm is trained to group change events that are likely to correspond to a same change event;
  determine a potentially unauthorized change cluster from the plurality of change clusters, wherein determining the potentially unauthorized change cluster is based on determining that no change event in the potentially unauthorized change cluster is matched with the one or more change orders in the cloud computing environment;
  generate, by the change order monitoring application, an alert for the potentially unauthorized change cluster based on at least a first change event in the potentially unauthorized change cluster; and
  send the alert for the potentially unauthorized change cluster to an implementer of the first change event.

12. The system of claim 11, wherein the clustering of the plurality of change events is based on determining two change events that are part of a same user login, are from a same application service, and occurred within one hour of each other.

13. The system of claim 11, wherein the machine learning algorithm comprises a python implementation of a Louvain community detection algorithm and is trained to cluster the plurality of change events using a weighted event graph comprising the plurality of change events with one or more related connections between the plurality of change events.

14. The system of claim 13, wherein the change order monitoring application creates a weighted event graph with the plurality of change events as edges between the plurality of change events that are part of the same change event, and the Louvain community detection algorithm partitions the same change events into the change clusters, wherein the edges are determined by one or more edge variables that comprise a resource environment identifier, a resource identifier, and an access key identifier.

15. The system of claim 13, wherein the change order monitoring application creates the weighted event graph with the plurality of change events as edges between the plurality of change events that are part of the same change event, and the Louvain community detection algorithm partitions the same change events into the change clusters, wherein the edges are determined by one or more edge variables that comprise a resource environment identifier, a resource identifier, and an access key identifier.

16. The system of claim 11, wherein generating the alert comprises requesting additional information from the implementer of the potentially unauthorized change cluster, and the alert appears on a dashboard.

17. One or more non-transitory media storing instructions that, when executed by one or more processors, cause the one or more processors to perform steps comprising:
    receiving, by a change order monitoring application, one or more audit logs from one or more application services in a cloud computing environment, wherein the one or more audit logs comprises a plurality of change events, wherein the plurality of change events require a change order;
    matching, by the change order monitoring application, respective change events of the plurality of change events to one or more change orders in the cloud computing environment by:
        matching a change order configuration item to one of the one or more application services through mapping to a change management database;
        determining an event time window for the one or more change orders and ensuring the matched respective change events of the plurality of change events are within the event time window; and
        determining an implementer of the change order configuration item is a member of an implementing group for the change order;
    clustering, using a machine learning algorithm, the plurality of change events to form a plurality of change clusters based on the plurality of change events, wherein the machine learning algorithm is trained to group change events that are likely to correspond to a same change event;
    determining a potentially unauthorized change cluster from the plurality of change clusters, wherein determining the potentially unauthorized change cluster is based on determining that no change event in the potentially unauthorized change cluster is matched with the one or more change orders in the cloud computing environment;
    generating, by the change order monitoring application, an alert for the potentially unauthorized change cluster based on at least a first change event in the potentially unauthorized change cluster; and
    sending the alert for the potentially unauthorized change cluster to an implementer of the first change event.

18. The one or more non-transitory media storing instructions of claim 17, wherein the machine learning algorithm comprises a python implementation of a Louvain community detection algorithm and is trained to cluster the plurality of change events using a weighted event graph comprising the plurality of change events with one or more related connections between the plurality of change events and further wherein the change order monitoring application creates the weighted event graph with the plurality of change events as edges between the plurality of change events that are part of the same change event, and the Louvain community detection algorithm partitions the same change events into the change clusters, wherein the edges are determined by one or more edge variables that comprise a resource environment identifier, a resource identifier, and an access key identifier.

* * * * *